(12) United States Patent
Galcerán

(10) Patent No.: US 10,743,569 B2
(45) Date of Patent: Aug. 18, 2020

(54) METHOD FOR THE TREATMENT OF CORN KERNELS INTENDED FOR THE PRODUCTION OF POPCORN USING MICROWAVE APPLIANCES, AND RESULTING PRODUCT

(71) Applicant: DODE, S.A., Barcelona (ES)

(72) Inventor: Carlos Galcerán, Barcelona (ES)

(73) Assignee: DODE, S.A., Barcelona (ES)

( * ) Notice: Subject to any disclaimer, the term of this patent is extended or adjusted under 35 U.S.C. 154(b) by 1056 days.

(21) Appl. No.: 14/425,009

(22) PCT Filed: Jul. 11, 2013

(86) PCT No.: PCT/ES2013/070497
§ 371 (c)(1),
(2) Date: Feb. 28, 2015

(87) PCT Pub. No.: WO2014/033338
PCT Pub. Date: Mar. 6, 2014

(65) Prior Publication Data
US 2016/0058043 A1  Mar. 3, 2016

(30) Foreign Application Priority Data

Aug. 27, 2012  (ES) .................................. 201231330

(51) Int. Cl.
*A23L 7/183*  (2016.01)

(52) U.S. Cl.
CPC ........... *A23L 7/183* (2016.08); *A23V 2002/00* (2013.01)

(58) Field of Classification Search
CPC ............................ A23V 2002/00; A23L 7/183
USPC ......................................................... 426/309
See application file for complete search history.

(56) References Cited

U.S. PATENT DOCUMENTS

| 3,961,091 A | * | 6/1976 | Caccavale | ............... | A23L 7/183 |
| | | | | | 426/307 |
| 4,767,635 A | * | 8/1988 | Merritt | .................... | A23L 7/183 |
| | | | | | 426/272 |
| 5,753,287 A | * | 5/1998 | Chedid | ............ | C12Y 302/0100 |
| | | | | | 426/102 |

FOREIGN PATENT DOCUMENTS

| CN | 101617721 A | * | 1/2010 | | |
| EP | 0242828 A2 | * | 10/1987 | ............. | A23L 7/183 |
| EP | 0262791 A2 | * | 4/1988 | ............. | A23L 7/191 |

OTHER PUBLICATIONS

Ethan Huff "Sunflower lecithin, the new alternative to soy lecithin" source naturalsolutionsradio.com Jun. 16, 2010, 3 pages.*

* cited by examiner

*Primary Examiner* — Jyoti Chawla
(74) *Attorney, Agent, or Firm* — Hoglund & Pamias, PSC; Roberto J. Rios

(57) ABSTRACT

The aim of the invention is to provide a healthier product which contains less fat and no allergens and which, once cooked in a microwave appliance, is crunchy and does not stick together, such that the resulting popcorn is as homogeneous as possible. For this purpose, according to the invention, instead of coating the corn kernels with oils during treatment, they are instead coated with sunflower lecithin, a much healthier product that can be used to achieve the results mentioned above.

5 Claims, No Drawings

METHOD FOR THE TREATMENT OF CORN KERNELS INTENDED FOR THE PRODUCTION OF POPCORN USING MICROWAVE APPLIANCES, AND RESULTING PRODUCT

OBJECT OF THE INVENTION

The present invention relates to a method that has been specially designed for the treatment of corn kernels when these can be cooked in a microwave apparatus in order to obtain the classic "popcorn".

The object of the invention to provide a method by which a healthy and crunchy product is obtained in which the obtained popcorn are not lumpy, so that it presents a more uniform cooking and a more flavorful texture is obtained.

BACKGROUND OF THE INVENTION

In the field of practical application of the invention, it is known to give the corn kernels many treatments so that these can be transformed into popcorn in a microwave apparatus.

To do this, the corn kernel is not heated directly, but must be treated with oils, starches or similar and other flavoring products such as salt, sugar, butter, etc. . . . .

In regards to the oils used, the most common is palm oil, which has been found that is not the healthiest product, because it is high in harmful fats, to which must be added the fact that with these oils, the product obtained is stuck together, presenting a heterogeneous texture, in which certain areas are not crispy but soft, with the consequent and negative result that it entails.

Trying to obviate this problem, in the patent EP0242828, the use of soy is provided to prevent sticking together popcorn when it is hatching.

However, while it is true that popcorn that is less stuck together can be obtained by using soybean lecithin, it contains allergens, i.e., protein substances that can cause allergies in susceptible individuals, in addition the product obtained has a quality that can still be improved, both in terms of the crispness of popcorn, and the degree of disaggregation of the product obtained.

DESCRIPTION OF THE INVENTION

The proposed procedure for processing corn grain is believed to be a further development over the prior art that just described, that allows obtaining a healthier, crunchier product, and where corn flakes are completely disaggregated once obtained.

To do this, and more specifically, the method of the invention starts, as is conventional, with the mixture of the dried corn kernels in a flavoring solution, which can comprise salt, sugar, butter, or any conventional flavoring product with the particularity that in replacement of the previously mentioned oils or soybean lecithin, sunflower lecithin is used in liquid or solid form.

This component, the use of sunflower lecithin, constitutes the essence of the invention, due to its low fat content and the particularity that does not contain allergens, to which must be added the high degree of dissociation of cornflakes obtained by employing the same, and the product extremely crisp texture.

Corn kernels, once mixed in the above solution for a preset time, together with the usual flavoring products, according to the humidity are dried and packaged, ending the procedure.

The invention also concerns the product obtained, consisting of a corn kernel which incorporates a coating based on sunflower lecithin and flavoring product, such as salt, sugar, butter or the like.

PREFERRED EMBODIMENT OF THE INVENTION

By way of example, a practical embodiment of the invention is described, although the quantity of the product used, is not to be considered in a limiting manner but merely illustrative and may vary within the scope of the claims. Thus, by way of example, for the treatment of 80 grams of raw and dry corn, for different finishes, the following products are mixed for a time ranging from less than one minute and three minutes:

| | |
|---|---|
| Sunflower lecithin | 2 grams; |
| or | |
| Sunflower lecithin | 2 grams |
| Salt | 6 grams; |
| or | |
| Sunflower lecithin | 2 grams |
| Salt | 6 grams |
| Butter flavoring | 1 gram; |
| or | |
| Sunflower lecithin | 2 grams |
| Brown Sugar | 2 grams |
| and/or molasses | 1 gram |
| and/or stevia sweetener | 1 gram |
| and/or caramel flavoring | 1 gram. |

Corn kernels are mixed with said products for the appropriate time based on the additional additives, and are allowed to dry for subsequent packaging.

Thus, the obtained product has, after the treatment process, a coating based on sunflower lecithin and flavored product, that allows after cooking in the microwave apparatus, a pop corn extremely low in fat, crispy, with homogeneous texture, which do not lump, and with the assurance that do not contain allergens.

As stated above, the example just described refers only to obtaining a type of popcorn, while the flavoring products could be any other applicable product for this kind of foods, without affecting the essence of the invention.

The invention claimed is:

1. A method for treating corn kernels that are subsequently subjected to a drying and packaging process, wherein said corn kernels are suitable for obtaining popcorn using a microwave apparatus, said method consisting of:
mixing corn kernels with a solution of sunflower lecithin for promoting dissociation and crisp texture of the corn kernels alone or in combination with at least one flavoring product, wherein said solution is free of oils and soy lecithin.

2. The method of claim 1, wherein said corn kernels are mixed for a preset time.

3. The method of claim 1, wherein said at least one flavoring product is selected from the group consisting of: salt, sugar, sweetener, molasses, caramel, and butter.

4. Corn kernels suitable for obtaining popcorn using a microwave apparatus, said corn kernels consisting of: a coating of sunflower lecithin for promoting dissociation and crisp texture of the corn kernels alone or in combination with at least one flavoring product, wherein said coating is free of oils and soy lecithin.

5. The corn kernels of claim 4, wherein said at least one flavoring product is selected from the group consisting of: salt, sugar, sweetener, molasses, caramel, and butter.

\* \* \* \* \*